(12) United States Patent
Weidner et al.

(10) Patent No.: US 10,202,885 B2
(45) Date of Patent: Feb. 12, 2019

(54) FLANGE PLATE

(71) Applicant: TENNECO GMBH, Edenkoben (DE)

(72) Inventors: Michael Weidner, Edenkoben (DE);
Andreas Steigert, Lambrecht (DE);
Bernd Fuhrmann, Harthausen (DE);
Rolf Engel, Maikammer (DE); Adrien Lehmann, Schleithal (FR)

(73) Assignee: TENNECO GMBH, Edenkoben (DE)

( * ) Notice: Subject to any disclaimer, the term of this patent is extended or adjusted under 35 U.S.C. 154(b) by 814 days.

(21) Appl. No.: 14/777,637

(22) PCT Filed: Mar. 19, 2014

(86) PCT No.: PCT/EP2014/055524
§ 371 (c)(1),
(2) Date: Sep. 16, 2015

(87) PCT Pub. No.: WO2014/147136
PCT Pub. Date: Sep. 25, 2014

(65) Prior Publication Data
US 2016/0138458 A1 May 19, 2016

(30) Foreign Application Priority Data

Mar. 20, 2013 (DE) .......................... 10 2013 102 859

(51) Int. Cl.
*F01N 13/18* (2010.01)
*B32B 5/18* (2006.01)
(Continued)

(52) U.S. Cl.
CPC ............ *F01N 13/1827* (2013.01); *B32B 5/18* (2013.01); *F01N 13/10* (2013.01);
(Continued)

(58) Field of Classification Search
CPC .. F01N 13/1827; F01N 13/10; F01N 13/1805;
F16L 23/162; F16L 23/12; F16L 23/032;
B32B 5/18
See application file for complete search history.

(56) References Cited

U.S. PATENT DOCUMENTS 3,110,961 A   11/1963 Melill et al.
4,417,733 A * 11/1983 Usher ..................... B32B 15/04
                                                   264/239
(Continued)

FOREIGN PATENT DOCUMENTS

DE   28 53 722 A1   6/1980
DE   34 34 288 A1   3/1986
(Continued)

*Primary Examiner* — James M Hewitt, II
(74) *Attorney, Agent, or Firm* — Hudak, Shunk & Farine Co. LPA

(57) ABSTRACT

A flange plate for a manifold of an exhaust-gas system for internal combustion engines, which flange plate can be fixed via at least one holding device to an exhaust-gas outlet connecting piece of the internal combustion engine by a first outer layer, formed as a mounting layer, which can be placed at least partially directly or indirectly against the exhaust-gas outlet connecting piece via a seal, and the flange plate can be applied to the holding device by a second outer layer, formed as a holding layer, in order to generate a holding force F, acting at a right angle to the mounting layer, for sealingly placing the mounting layer against the exhaust-gas outlet connecting piece, and the flange plate having at least a first intermediate layer which is arranged, relative to the holding force F, between the mounting layer and the holding layer. Here, the first intermediate layer is formed as a cavity structure, wherein the cavity structure has single- or multiple-part wall parts which extend in a direction parallel to the mounting layer and are arranged adjacent to one another, the wall parts having a width b1, measured in a direction (Continued)

parallel to the mounting layer, and having a height h1, measured in a direction at a right angle to the mounting layer, where h1>b1, wherein the different wall parts delimit a plurality of cavities which are open towards the mounting layer or towards the holding layer or, together with the mounting layer and the holding layer, delimit an open-ended channel.

20 Claims, 2 Drawing Sheets

(51) Int. Cl.
  *F01N 13/10* (2010.01)
  *F16L 23/032* (2006.01)
  *F16L 23/12* (2006.01)
  *F16L 23/16* (2006.01)
(52) U.S. Cl.
  CPC ........ *F01N 13/1805* (2013.01); *F16L 23/032* (2013.01); *F16L 23/12* (2013.01); *F16L 23/162* (2013.01); *B32B 2266/045* (2013.01); *F01N 2340/00* (2013.01)

(56) References Cited

U.S. PATENT DOCUMENTS

| | | | |
|---|---|---|---|
| 6,055,790 A | 5/2000 | Lunde et al. | |
| 6,298,660 B1* | 10/2001 | Daly | F01N 13/10 60/282 |
| 2011/0159247 A1* | 6/2011 | Sugimoto | B32B 5/18 428/174 |
| 2012/0273300 A1* | 11/2012 | Jones | F01N 1/006 181/228 |

FOREIGN PATENT DOCUMENTS

| | | |
|---|---|---|
| DE | 37 17 989 A1 | 12/1988 |
| DE | 196 50 613 A1 | 6/1998 |
| DE | 103 37 156 A1 | 3/2005 |
| DE | 197 35 061 B4 | 9/2007 |
| EP | 2 410 148 A1 | 1/2012 |
| GB | 2475088 A | 11/2011 |
| JP | 2003-191360 A | 7/2003 |
| JP | 2009-36074 A | 2/2009 |
| WO | 2007 149535 A1 | 12/2007 |

\* cited by examiner

B-B

A-A

FLANGE PLATE

FIELD OF THE INVENTION

The invention relates to a flange plate for a manifold of an exhaust-gas system for internal combustion engines, which flange plate can be fixed via at least one holding means to an exhaust-gas outlet connecting piece of the internal combustion engine, with a first outer layer, formed as a mounting layer, which can be placed at least partially directly or indirectly via a seal against the exhaust-gas outlet connecting piece, which can be applied to the holding means by means of a second outer layer, formed as a holding layer, in order to generate a holding force F, acting at a right angle to the mounting layer and/or against the exhaust-gas outlet connecting piece, for sealingly placing the mounting layer against the exhaust-gas outlet connecting piece, with at least a first intermediate layer which is arranged, relative to the holding force F, between the mounting layer and the holding layer.

BACKGROUND OF THE INVENTION

Already known from DE 37 17 989 A1 is a multi-layer flange plate for automotive manifold pipes which is formed by a first layer, a second layer and several intermediate layers. The intermediate layers consist of grating material or of perforated sheets. As an alternative, metal plates are provided which have openings in unstressed areas in order to reduce the weight of the flange plate.

Already known from DE 28 53 722 A1 is a flange formed by two flange rings, wherein a pipe section is provided in the space between the two flange rings, the length of said pipe section corresponding to the largest height between the rings. It is further provided that the space between the two flange rings is foamed with a synthetic material.

Already known from DE 103 37 156 A1 is an exhaust-gas pipe having a porous metallic interior lining.

The "holding force F acting against the exhaust-gas outlet connecting piece" refers to a holding force F that generates at least a partial force that extends in a direction normally to one sealing surface of the exhaust-gas outlet connecting piece.

SUMMARY OF THE INVENTION

The object of the present invention is to propose a flange plate that is formed and arranged in such a manner as to ensure an improved thermal conductivity and a reduced weight.

According to the present invention, the object is accomplished by the first intermediate layer being formed as a cavity structure, wherein the cavity structure has single- or multiple-part wall parts which extend in a direction parallel to the mounting layer and are arranged adjacent to one another, said wall parts having a width b1, measured in a direction parallel to the mounting layer, and having a height h1, measured in a direction at a right angle to the mounting layer, where h1>b1, wherein the different wall parts delimit a plurality of cavities which are open towards the mounting layer or towards the holding layer, or delimit, together with the mounting layer and the holding layer, an open-ended channel, or wherein the first intermediate layer is made of metal foam.

By applying a cavity structure, a substantial weight reduction is attainable. Furthermore, the multi-layer design makes it possible to envisage a novel mixture of materials, in particular in the context of applying cavity structures on the one hand and of applying metal foam and/or ceramic foam on the other hand. The application of sheet metal and ceramic or metal foam, in particular, ensures on the one hand the prescribed rigidity on the whole and the contact forces required for sealing despite the substantial weight reduction as well as, on the other hand, the mechanical fixation or mounting of the manifold. In the case of metal and/or ceramic foam, open-cell foams and/or closed-cell foams may be considered as long as they have the rigidity required to provide the necessary holding force F for sealingly placing the flange against the exhaust-gas outlet connecting piece.

The object is also accomplished by a system consisting of a manifold or an exhaust-gas system for internal combustion engines with a flange plate as mentioned above.

It can also prove advantageous to provide a further intermediate layer, said intermediate layer being formed as a cavity structure and having a single- or multiple-part wall which extends in a direction parallel to the mounting layer.

The application of a second intermediate layer ensures a further change of materials with respect to the composition of the first intermediate layer and the further intermediate layer. This can be motivated by the fact that the further intermediate layer which is located further outside is subjected to lower thermal stresses, therefore making a selection of different materials feasible. Even if the same material is selected, it is possible in principle to use a different architecture, in particular with respect to the design of the cavity structure as such. This applies in particular to the geometry of the wall or walls which unfold the cavity structure, in other words to the ratio of height to width of said wall or walls.

Furthermore, it can be advantageous if the further intermediate layer is made of metal foam.

In principle, it is also provided that different metal foams are utilised for the different layers. A corresponding composition can be chosen, as has already been described above, for example depending on the thermal stress the respective intermediate layer is subjected to.

In this context, it can be advantageously provided that a separating layer is provided between the first intermediate layer and the further intermediate layer, said separating layer being made of sheet metal or ceramics.

The separating layer ensures a complete and full-surface transmission of the applied holding forces such that the forces are distributed evenly on both layers, respectively. The intermediate layer thus also has a supportive function, such that the forces absorbed by one layer can be deflected via the intermediate layer to the further or neighbouring intermediate layer.

It can be of particular importance for the present invention if the following applies to the ratio of h1 to b1: $h1 \geq x \cdot b1$, with $1.5 \leq X \leq f_{max}$, with $f_{max} \leq 20$, $f_{max} \leq 100$, $f_{max} \leq 500$, $f_{max} \leq 1000$ or $f_{max} \leq 2000$.

The ratio of h1 to b1 is primarily determined by the applicable holding force on the one hand and by the density of the cavity structure or the distance between the individual wall elements of said cavity structure on the other hand. A further parameter that needs to be mentioned is temperature distribution, starting from the relatively hot mounting layer and leading to the relatively cool holding layer.

It can be advantageous in connection with a design and arrangement in accordance with the present invention if a wall has a height h4 and a width b4 such that the following applies to the ratio of the height h4 to the width b4:h4 xb4, with $1.5 \leq X \leq f_{max}$, with $f_{max} \leq 20$, $f_{max} \leq 100$, $f_{max} \leq 500$, $f_{max} \leq 1000$ or $f_{max} \leq 2000$.

This also applies correspondingly to the design of the cavity structure of the further intermediate layer. Regardless of the ratio mentioned above, it is certainly also of significance how close to each other the different wall sections are arranged, since this significantly determines the admissible wall-specific mounting pressure. For wall sections which are adjacent or arranged in parallel, the specified distance is preferably not larger than a third of the flange width.

It can be advantageous for the present invention if the height h4 of the further intermediate layer is greater than the height h1 of the first intermediate layer or if the ratio of h1 to b1 of the first intermediate layer is less than the ratio of h4 to b4 of the further intermediate layer.

As has already been explained above, it is possible to provide the intermediate layers of the architecture with different designs with respect to their form, based, in particular, on the applicable temperature level for the respective intermediate layer. Due to the thermal stresses mentioned above, different designs with respect to the materials used are also possible. A design that is slightly weaker overall and less resilient can be chosen for the intermediate layer located further outside due to the lower thermal stress, since it requires a lower rigidity due to reduced thermal stress.

It can be advantageous to combine one or several intermediate layers made of metal foam with one or several intermediate layers with a cavity structure. The intermediate layers can be separated by a separating layer made of sheet metal or ceramics.

Of course the latter also includes the combination of cavity structures with metal foam structures. The intermediate layers have to be arranged in a multi-layer flange plate in accordance with their physical properties and preferably to be separated from each other via corresponding separating layers. All in all, this can result in a varied mixture of materials that conforms to the desired specifications with respect to stability, on the one hand, and weight, on the other hand.

BRIEF DESCRIPTION OF THE DRAWINGS

Other advantages and details of the present invention are explained in the patent claims and the description and illustrated in the figures. The figures show:

FIG. 1b a top view according to cross-section AA from FIG. 1a;

DETAILED DESCRIPTION OF THE INVENTION

Figure 1A:
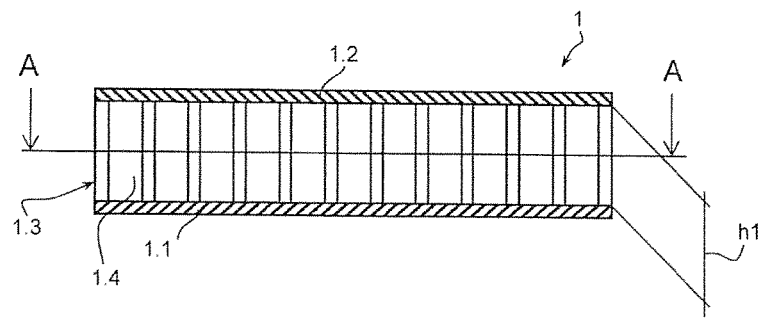
FIG. 1a a cross-sectional view according to cross-section BB from FIG. 1b of a flange plate with a cavity structure.
Figure 1B:
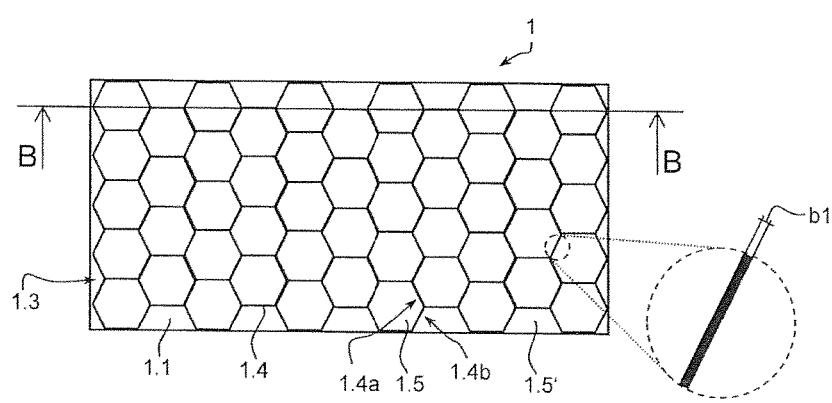

FIG. 1a shows a flange plate 1 in the cross-section BB according to FIG. 1b. It is formed by a mounting layer 1.1 formed as a first outer layer, a holding layer 1.2 formed as a second outer layer and a first intermediate layer 1.3 located or arranged between the two outer layers. The flange plate 1 can be placed via the mounting layer 1.1 against, for example, a cylinder head 2.4 of an internal combustion engine 2, which would normally be achieved by using a seal 3 between the flange plate 1 and the cylinder head 2.4.

The first intermediate layer 1.3 has a honeycombed cavity structure according to FIG. 1b, said cavity structure consisting substantially of a single- or multiple-part wall 1.4 which is formed as a honeycomb structure with a plurality of hexagonally shaped cavities 1.5. The cavities 1.5 are delimited in their circumference by different wall parts 1.4a, 1.4b. The front and rear side of the respective cavity 1.5 are delimited by the aforesaid mounting layer 1.1 and holding layer 1.2. The aforesaid wall 1.4 has a height h1 and a width b1 in accordance with the detailed representation in FIG. 1b. The ratio between h1 and b1 illustrated here is approximately 20.

The cavities 1.5' placed at the edge of the mounting layer 1.1 according to FIG. 1b, which are not fully hexagonally shaped, are not delimited either by wall parts 1.4a, 1.4b of the wall 1.4 or by the mounting layer 1.1 or the holding layer 1.2. Unless a separate frame is provided, they are laterally open.

Figure 2:
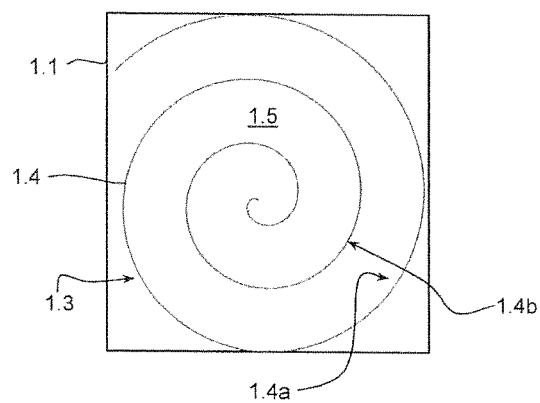
FIG. 2 a top view according to FIG. 1b for an alternative embodiment of the cavity structure.

In the embodiment according to FIG. 2, a spiral-shaped or snail-shaped wall 1.4 is provided. The wall 1.4 in combination with the mounting layer 1.1 and the holding layer 1.2 delimits a snail-shaped cavity 1.5 formed as a channel. In this cavity structure, the respective wall parts 1.4a, 1.4b of the wall 1.4 in combination with the mounting layer 1.1 and the holding layer 1.2 delimit an open-ended snail-shaped channel 1.5.

Figure 3:
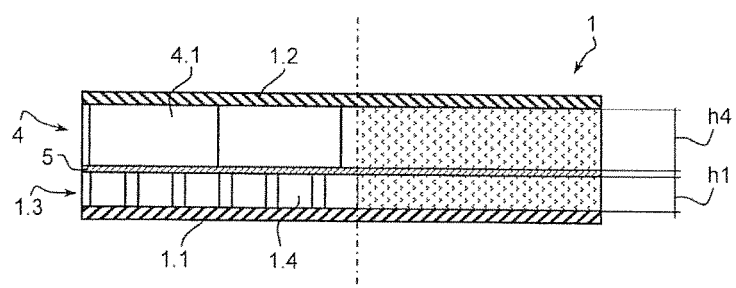
FIG. 3 a cross-sectional view of an alternative embodiment with two intermediate layers.

In the embodiment according to FIG. 3, a further intermediate layer 4 is provided in addition to the first intermediate layer 1.3. While the first intermediate layer 1.3 has a height h1, the further intermediate layer 4 has a height h4 which is greater than the height h1. The left-hand part of FIG. 3 shows a cavity structure, as has already been illustrated in FIGS. 1a, 1b, 2 and 4. According to the right-hand part of FIG. 3, the intermediate layers 1.3, 4 are made of metal foam, which has a different structure without wall parts. In a further embodiment that is not shown, the height h1 and the height h4 may also be the same or the height h1 may be greater than the height h4.

The design of the respective wall 1.4 or wall 4.1 of the further intermediate layer 4 or the metal foam layer 1.3, 4 is chosen depending on the respective requirements for a holding force F. In the case of the cavity structures according to the left-hand part of the Figure, this applies not only to the ratio of the respective height h4 to a width b4 or of the height h1 to the width b1 but also to the wall materials utilised, be they sheet metal or, for example, ceramics.

Figure 4:
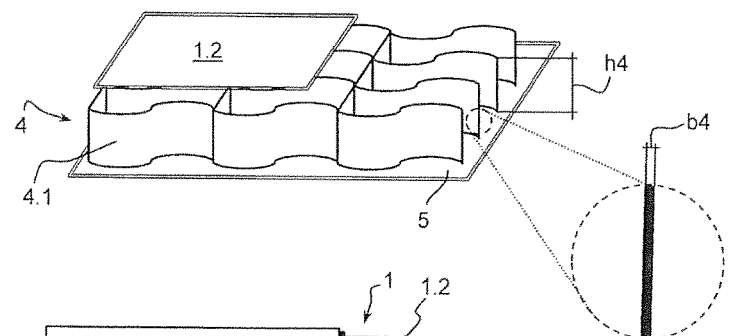
FIG. 4 a perspective view regarding a further embodiment of a cavity structure.

As an alternative, FIG. 4 shows a wave-shaped wall pattern of a further intermediate layer 4 with a height h4 and a width b4, said wall pattern forming correspondingly shaped cavity structures.

Figure 5:
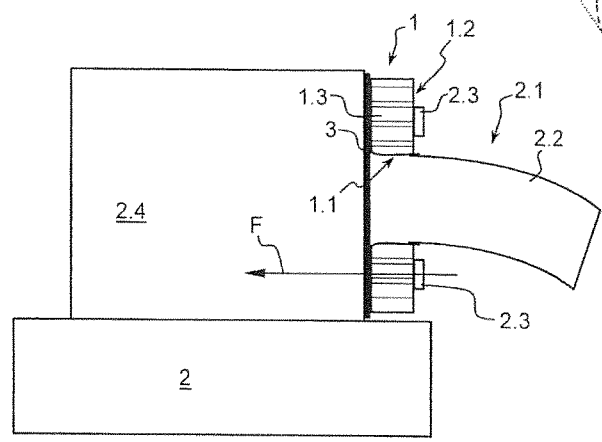
FIG. 5 a schematic sketch of an internal combustion engine with exhaust-gas system, manifold and flange plate.

FIG. 5 shows a schematic sketch of a system consisting of an internal combustion engine 2 with a cylinder head or exhaust-gas outlet connecting piece 2.4 to which an exhaust-gas system 2.1 with a manifold 2.2 is attached. The manifold 2.2 is attached to the cylinder head 2.4 by means of the flange plate 1 via a plurality of holding means 2.3 formed as holding screws. A seal 3 is provided between the flange plate 1 and the cylinder head 2.4. The screw or the holding means 2.3 are designed in such a way that at least one holding force F which extends, at least in part, normally to the cylinder head 2.4 or its sealing surface is generated in order to adjoin the flange plate 1 against the cylinder head 2.4. In the region of the outlet opening, the mounting layer 1.1 is led outwards and connected to the manifold 2.2 such that the required tightness is achieved in the regions between the mounting layer 1.1 and the seal 3 and between the mounting layer 1.1 and the manifold 2.2. The sealing force is achieved via the screw 2.3, the holding layer 1.2 and the intermediate layer 1.3.

REFERENCE SYMBOL LIST 1 flange plate
1.1 mounting layer, first outer layer
1.2 holding layer, second outer layer
1.3 first intermediate layer, metal foam layer
1.4 wall
1.4a wall part
1.4b wall part
1.5 cavity, channel
1.5' cavity
2 internal combustion engine
2.1 exhaust-gas system
2.2 manifold
2.3 holding means, screw
2.4 exhaust-gas outlet connecting piece, cylinder head
3 seal
4 further intermediate layer, metal foam layer
4.1 wall
5 separating layer, metal plate, ceramic plate
b1 width of 1.3
b4 width of 4
F holding force
h1 height of 1.3
h4 height of 4

What is claimed is:

1. A flange plate for a manifold of an exhaust-gas system for internal combustion engines, comprising: the flange plate which can be fixed via at least one holding device to an exhaust-gas outlet connecting piece of the internal combustion engine by a first outer layer, formed as a mounting layer, which can be placed at least partially directly or indirectly against the exhaust-gas outlet connecting piece via a seal, said flange plate being applicable to the holding device by a second outer layer, formed as a holding layer, in order to generate a holding force F, acting at a right angle to the mounting layer, for sealingly placing the mounting layer against the exhaust-gas outlet connecting piece, said flange plate having at least a first intermediate layer which is arranged, relative to the holding force F, between the mounting layer and the holding layer,
wherein the first intermediate layer is formed as a cavity structure, wherein the cavity structure has single- or multiple-part wall parts which extend in a direction parallel to the mounting layer and are arranged adjacent to one another, said wall parts having a width b1, measured in a direction parallel to the mounting layer, and having a height h1, measured in a direction at a right angle to the mounting layer, where h1>b1, wherein the single- or multiple-part wall parts
a) delimit a plurality of cavities which are open towards the mounting layer or towards the holding layer or
b) delimit, together with the mounting layer and the holding layer, an open-ended channel.

2. The flange plate according to claim 1, wherein a further intermediate layer is provided, said intermediate layer being formed as a cavity structure and having the single- or multiple-part wall which extends in a direction parallel to the mounting layer.

3. The flange plate according to claim 2, wherein a separating layer is provided between the first intermediate layer and a further intermediate layer, wherein the separating layer is made of sheet metal or ceramics.

4. The flange plate according to claim 2, wherein a wall of the further intermediate layer has a height h4 and a width b4, wherein the following applies to the ratio of the height h4 to the width b4:h4≥xb4, with $1.5 \leq X \leq f_{max}$, with $f_{max} \leq 2000$.

5. The flange plate according to claim 4, wherein the height h4 of the further intermediate layer is greater than the height h1 of the first intermediate layer, or the ratio of h1 to b1 of the first intermediate layer is less than the ratio of h4 to b4 of the further intermediate layer.

6. The flange plate according to claim 1, wherein the following applies to the ratio of h1 to b1:h1≥xb1, with $1.5 \leq X \leq f_{max}$, with $f_{max} \leq 2000$.

7. The flange plate according to claim 1, further including at least one intermediate layer which is made of metal foam.

8. A system consisting of a manifold or an exhaust-gas system for internal combustion engines with a flange plate according to claim 1.

9. The system according to claim 8, wherein the manifold is mechanically coupled with the mounting layer.

10. A flange plate for a manifold of an exhaust-gas system for internal combustion engines, comprising: the flange plate which can be fixed via a holding device to an exhaust-gas outlet connecting piece of the internal combustion engine by a first outer layer, formed as a mounting layer, which can be placed at least partially directly or indirectly against the exhaust-gas outlet connecting piece via a seal, said flange plate being applicable to the holding means by a second outer layer, formed as a holding layer, in order to generate a holding force F, acting at a right angle to the mounting layer (1.1), for sealingly placing the mounting layer against the exhaust-gas outlet connecting piece, said flange plate having at least a first intermediate layer which is arranged between the mounting layer and the holding layer in order to transmit the holding force F, wherein the first intermediate layer is made of metal foam.

11. The flange plate according to claim 10, wherein a further intermediate layer is provided, said intermediate layer being made of metal foam.

12. The flange plate according to claim 11, wherein a separating layer is provided between the first intermediate layer and the further intermediate layer, wherein the separating layer is made of sheet metal or ceramics.

13. The flange plate according to claim 12, wherein the following applies to the ratio of h1 to b1:h1≥xb1, with $1.5 \leq X \leq f_{max}$, with $f_{max} \leq 2000$.

14. The flange plate according to claim 13, wherein a wall of the further intermediate layer has a height h4 and a width b4, wherein the following applies to the ratio of the height h4 to the width b4:h4≥xb4, with $1.5 \leq X \leq f_{max}$, with $f_{max} \leq 2000$.

15. The flange plate according to claim 14, wherein the height h4 of the further intermediate layer is greater than the height h1 of the first intermediate layer, or the ratio of h1 to b1 of the first intermediate layer is less than the ratio of h4 to b4 of the further intermediate layer.

16. The flange plate according to claim 15, further including at least one intermediate layer which is made of metal foam.

17. The flange plate according to claim 11, wherein at least one intermediate layer is provided which is formed as a cavity structure and having a single- or multi-part wall which extends in a direction parallel to the mounting layer.

18. The flange plate according to claim 10, wherein at least one intermediate layer is provided which is formed as a cavity structure and having a single- or multi-part wall which extends in a direction parallel to the mounting layer.

19. A system consisting of a manifold or an exhaust-gas system for internal combustion engines with a flange plate according to claim 10.

20. The system according to claim 19, wherein the manifold is mechanically coupled with the mounting layer.

* * * * *